March 31, 1925.

W. C. HEDGCOCK

BRAKE MECHANISM

Filed Jan. 19, 1921

1,531,284

Inventor
William C. Hedgcock,

Patented Mar. 31, 1925.

1,531,284

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

Application filed January 19, 1921. Serial No. 438,280.

*To all whom it may concern:*

Be it known that I, WILLIAM C. HEDGCOCK, a citizen of the United States, residing at Chicago, in the county of Cook and State of Illinois, have invented certain new and useful Improvements in Brake Mechanism, of which the following is a specification.

This invention relates to brake mechanism.

One object of the invention is to provide a simple, durable and efficient connection and support for various parts of the brake rigging on car trucks where it is desirable to support some of the parts of the rigging from a member of the truck which has a relative movement with respect to other portions of the truck, from which other parts of the truck rigging are supported, and to do so without deranging the action of the brake.

Another object is to provide a simple and compact brake rigging adapted to meet the various requirements for successful commercial operation.

These and other objects are accomplished by means of the arrangement disclosed on the accompanying sheet of drawings, in which—

Figure 1 is a fragmentary side elevation of a railway car truck equipped with brake rigging embodying my invention; and, Figure 2 is a detail view showing a brake lever, a brake beam and my improved connection therebetween.

The various novel features of the invention will be apparent from the following description and the drawings and will be particularly pointed out in the appended claims.

This invention has particular reference to a brake rigging for car brakes in which the brake beams 10 are supported by brake hangers 11 from the side frame 12 and in which it is desirable to support other parts of the brake rigging from the truck bolster 13 which has relative vertical movement with respect to the side frame 12. This relative vertical movement is caused by the vertical oscillation of the truck bolster 13 mounted upon the springs 14 interposed between a portion of the side frame 12 and the bolster 13.

In this particular arrangement the brake rods 15, in addition to being brake connections, act as supports for the brake levers 16 to which they are pivotally connected by pins 17. The connecting rods 15 also form supports for the intermediate rods 18 which are pivotally connected at 19 to upper ends of adjacent brake levers 16. The connecting rods 15 perform the supporting function as a result of being supported at their outer ends by links 20 which in turn are pivotally connected at their upper ends to laterally extending arms 21 of the bolster 13. Pins 22 form the connection between the ends of the rods 15 and the links 20, and pins 23 form the pivotal connection between the links 20 and the bolster arms 21. It will be noted that the links 20 are provided with relatively long open slots so that the pins 22 may rise therein without restraint but may not drop further than the bottom of the slot, and of course the links 20 are free to swing from their pin connections 23. These swinging links 20 provide a support for the brake rods and brake levers and at the same time allow the usual movements of the rigging.

The lower end of each brake lever 16 is connected by a clevis 24 to a clevis-shaped member 25 which in turn is riveted to the associated brake beam 10. This clevis connection permits of vertical oscillation of the levers 16 with respect to the associated clevis-shaped members 25 and with respect to the associated brake beams 10, without oscillating the brake beams. This is important for the reason that the clearance between the brake shoes 26 and the wheels 27 is small when the brakes are released. Oscillation of the beam under such conditions would cause the shoes 26 to oscillate and rub the wheels, when such movement is not desired. With this arrangement and combination of parts, when the brakes are released, the truck bolster 13 is free to oscillate up and down on the springs 14, carrying with it the links 20, brake levers 16 and rods 15 and 18 without oscillating the brake beams 10, for the reason that this motion is absorbed by the connection between the clevis 24 and members 25. During this action the pin 22 remains at the bottom of its slot in link 20. However, when the brakes are applied, all of the brake rigging tends to stiffen and become rigid along its lines of pull, due to the tension and forces in the various parts. Accordingly, oscillation between the clevis 24 and associated clevis-shaped member 25 is not desirable, nor possible, to any extent. Therefore, while the brakes are applied the brake rigging practically maintains its equilibrium and support as a result of tension and forces within itself. During this period movement takes place between the rods 15 and the links 20, the pins 22 sliding upwardly and downwardly in the slots of the links 20 as the truck bolster 13 oscillates.

By means of this arrangement it is seen that the brake rigging at all times is properly supported, and even though parts supporting different portions of the brake rigging have a relative movement, no movement is transmitted to the brake beams or shoes whether the brakes are applied or released which movement would tend to force the brake shoes into engagement with the associated wheels 27 or would cause any of the brake rigging to assume abnormal positions.

By referring particularly to Figure 2, it will be noted that the member 25 has its opposite legs spread laterally with respect to each other, said legs being secured to the brake beams 10 by separate rivets 28 in a manner to give a bracing effect to the clevis 25. This is done without any extra material being required in the clevis and provides a structure which is braced laterally and does not tend to oscillate around its points of connection to the brake beam.

It is my intention to cover all modifications of the invention falling within the spirit and scope of the following claims.

I claim:

1. In brake mechanism, the combination of a brake beam, a brake rigging support having a vertical movement with respect to said beam, and means connecting said support and beam whereby said support may be moved vertically without causing said brake beam to be moved vertically.

2. In brake mechanism, the combination of a brake beam, means supporting a portion of the brake rigging having a relative movement with respect to said beam, and connecting means whereby said brake supporting means may be moved without causing transmission of said movement to said brake beam.

3. In brake mechanism, the combination of a brake beam, a movably mounted support for brake rigging which ordinarily would cause the brake beam to move toward the associated wheels, and connecting means whereby said supporting means may move without causing movement of the brake beam.

4. In brake mechanism, the combination of a brake beam, a movably mounted support for brake rigging which ordinarily would cause the brake beam to move toward the associated wheels, and connecting means whereby said supporting means may move without causing movement of the brake beam either when the brakes are released or applied.

5. In brake mechanism, the combination of a brake beam, a brake rigging support having a vertical movement with respect to said beam, and connecting means whereby said support may have a vertical movement without causing movement of said brake beam when the brakes are released.

6. In brake mechanism, the combination of a brake beam, a brake rigging support having a vertical movement with respect to said beam, connecting means whereby a vertical movement of said support may not be transmitted to said brake beam when the brakes are released, and other connecting means whereby said vertical movement of said support may not be transmitted to said brake beam when the brakes are applied.

7. In brake mechanism, the combination of a brake shoe, and supporting means whereby said brake shoe is supported from two relatively movable vertical supports and whereby such relative movement may not be transmitted to said brake shoe.

8. In brake mechanism, the combination of a brake shoe, two supports therefor arranged in different horizontal planes and having a relative movement with respect to each other, and means whereby such relative movement may not be transmitted to said brake shoe.

9. In brake mechanism, the combination of a brake shoe, a hanger for supporting said brake shoe, and a second hanger operatively connected to said brake shoe and having a relative movement with respect to said first hanger, and means whereby such relative movement may not be transmitted to said brake shoe.

10. In brake mechanism, the combination of a brake shoe, a plurality of relatively movable supports for said brake shoe, a brake lever operatively connected to said shoe and to said supports in a manner whereby said brake lever may have a relative movement with respect to said brake shoe under certain conditions without movement being transmitted to said brake shoe and whereby said brake lever may have a relative movement with respect to one of said supports under certain other conditions without movement being transmitted to said shoe.

11. In brake mechanism, the combination of a brake shoe, a plurality of relatively movable supports therefor, a brake lever operatively connected to said supports and to said brake shoe, and means whereby such relative movement may not be transmitted to said brake shoe when the brake is released, and other means whereby such relative movement may not be transmitted to said brake shoe when the brake is applied.

12. In brake mechanism, a brake beam, a support therefor, and a second support therefor having a relative vertical movement with respect to the first support, a brake lever having operative connections with both of said supports, one of said connections including a pivotal connection with respect to the brake beam whereby such relative movement may not be transmitted to the brake beam when the brake is released and the other of said connections being such that movement may not be transmitted to said brake beam when the brake is applied.

13. In combination, a side frame, a bolster movably mounted with respect thereto, a brake beam, a hanger connecting said brake beam and side frame, a brake lever having a clevis connection with respect to said brake beam, a pull rod connected to said brake lever, and a hanger connecting said bolster and said pull rod, the clevis connection between the brake lever and brake beam being such that movement may not be transmitted to said brake beam when the brake is released, the connection between the pull rod and bolster being such that movement may not be transmitted to said brake beam when the brake is applied.

14. In brake mechanism, a brake beam, a brake lever, and a connection therebetween including a clevis-like member having its legs spread laterally with respect to each other for forming a rigid connection against lateral movement.

15. In brake mechanism, a brake beam, a brake lever, and a connection therebetween including a clevis-like member having its legs spread laterally with respect to each other and separately secured to said brake beam for making a rigid connection therewith.

16. In brake mechanism, the combination of a brake beam, and a clevis-like member having its legs spread laterally with respect to each other and with respect to the beam for forming a rigid connection therewith.

Signed at Chicago, Illinois, this 14th day of January, 1921.

WILLIAM C. HEDGCOCK.